(12) United States Patent
Wakino

(10) Patent No.: US 11,704,546 B2
(45) Date of Patent: Jul. 18, 2023

(54) OPERATION PROCESSING APPARATUS THAT CALCULATES ADDRESSES OF FEATURE PLANES IN LAYERS OF A NEUTRAL NETWORK AND OPERATION PROCESSING METHOD

(71) Applicant: CANON KABUSHIKI KAISHA, Tokyo (JP)

(72) Inventor: Shiori Wakino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 16/916,507

(22) Filed: Jun. 30, 2020

(65) Prior Publication Data

US 2021/0004667 A1 Jan. 7, 2021

(30) Foreign Application Priority Data

Jul. 1, 2019 (JP) ................................. 2019-123135

(51) Int. Cl.
*G06N 3/063* (2023.01)
*G06T 1/20* (2006.01)
(Continued)

(52) U.S. Cl.
CPC ............. *G06N 3/063* (2013.01); *G06N 3/045* (2023.01); *G06T 1/20* (2013.01); *G06T 1/60* (2013.01)

(58) Field of Classification Search
CPC ........... G06T 1/20; G06T 1/60; G06N 3/0454; G06N 3/063; G06N 3/084; G06F 3/0604;
(Continued)

(56) References Cited

U.S. PATENT DOCUMENTS 8,391,306 B2 3/2013 Ito
9,665,799 B1 5/2017 Munteanu
(Continued)

FOREIGN PATENT DOCUMENTS

JP S6162187 A 3/1986
JP 5368687 B2 12/2013

OTHER PUBLICATIONS

Notice of Allowance issued in U.S. Appl. No. 16/619,334 dated Jan. 21, 2022.
(Continued)

*Primary Examiner* — Jacinta M Crawford
(74) *Attorney, Agent, or Firm* — Rossi, Kimms & McDowell LLP

(57) ABSTRACT

An apparatus for, by inputting data to a hierarchical neural network and performing operation processing in each layer of the network, calculating a feature plane in the layer, comprises an operation unit, a feature plane holding unit including at least one memory that holds a feature plane to be processed, a unit configured to control to arrange the feature plane in the memory based on network information as information about each layer undergoing the operation processing and to manage reading/writing from/in the memory, and a processor configured to access, via a bus, the feature plane holding unit which is address-mapped in a memory space. The processor calculates, based on the network information, an address address-mapped in the memory space, reads out the feature plane, and processes the feature plane.

8 Claims, 12 Drawing Sheets

(51) Int. Cl.
*G06T 1/60* (2006.01)
*G06N 3/045* (2023.01)

(58) Field of Classification Search
CPC ...... G06F 3/061; G06F 3/0655; G06F 3/0656; G06F 3/0659; G06F 3/0679; G06F 3/0688
USPC ..................................... 345/501; 706/15, 41
See application file for complete search history.

(56) References Cited

U.S. PATENT DOCUMENTS

| | | | |
|---|---|---|---|
| 2017/0116495 A1* | 4/2017 | Nomura | G06V 10/955 |
| 2018/0121795 A1* | 5/2018 | Kato | G06F 15/7867 |
| 2018/0173571 A1* | 6/2018 | Huang | G06N 3/0481 |
| 2018/0253641 A1* | 9/2018 | Yachide | G06N 3/04 |
| 2019/0095130 A1 | 3/2019 | Xu | |
| 2019/0361620 A1 | 11/2019 | Sasamoto | |

OTHER PUBLICATIONS

Office Action issued in U.S. Appl. No. 16/916,334 dated Sep. 15, 2021.
LeCun "Convolutional Networks and Applications in Vision." Proceedings of IEEE International Symposium on Circuits and Systems. 2010: pp. 253-256.
Copending U.S. Appl. No. 16/916,334, filed Jun. 30, 2020.

* cited by examiner

FIG. 4B

FEATURE PLANE OF SECOND LAYER

| | 16 PIXELS | | 16 PIXELS |
|---|---|---|---|

16 PIXELS

| a(0,0) | a(1,0) | a(2,0) | ... | a(15,0) |
|---|---|---|---|---|
| a(0,1) | a(1,1) | a(2,1) | ... | a(15,1) |
| a(0,2) | a(1,2) | a(2,2) | ... | a(15,2) |
| | | | | |
| a(0,15) | a(1,15) | a(2,15) | ... | a(15,15) |

905a

| MEMORY 3 |
|---|
| MEMORY 4 |
| MEMORY 5 |
| ... |
| MEMORY 3 |

905a

| b(0,0) | b(1,0) | b(2,0) | ... | b(15,0) |
|---|---|---|---|---|
| b(0,1) | b(1,1) | b(2,1) | ... | b(15,1) |
| b(0,2) | b(1,2) | b(2,2) | ... | b(15,2) |
| | | | | |
| b(0,15) | b(1,15) | b(2,15) | ... | b(15,15) |

905b

| MEMORY 4 |
|---|
| MEMORY 5 |
| MEMORY 3 |
| ... |
| MEMORY 4 |

905b

| c(0,0) | c(1,0) | c(2,0) | ... | c(15,0) |
|---|---|---|---|---|
| c(0,1) | c(1,1) | c(2,1) | ... | c(15,1) |
| c(0,2) | c(1,2) | c(2,2) | ... | c(15,2) |
| | | | | |
| c(0,15) | c(1,15) | c(2,15) | ... | c(15,15) |

905c

| MEMORY 5 |
|---|
| MEMORY 3 |
| MEMORY 4 |
| ... |
| MEMORY 5 |

905c

| d(0,0) | d(1,0) | d(2,0) | ... | d(15,0) |
|---|---|---|---|---|
| d(0,1) | d(1,1) | d(2,1) | ... | d(15,1) |
| d(0,2) | d(1,2) | d(2,2) | ... | d(15,2) |
| | | | | |
| d(0,15) | d(1,15) | d(2,15) | ... | d(15,15) |

905d

| MEMORY 3 |
|---|
| MEMORY 4 |
| MEMORY 5 |
| ... |
| MEMORY 3 |

905d

F I G. 5

| ADDRESS | MEMORY 0 | MEMORY 1 | MEMORY 2 |
|---|---|---|---|
| 0x0 | 903a(0,0)-(3,0) | 903a(0,1)-(3,1) | 903a(0,2)-(3,2) |
| 0x1 | 903a(4,0)-(7,0) | 903a(4,1)-(7,1) | 903a(4,2)-(7,2) |
| 0x2 | 903a(8,0)-(11,0) | 903a(8,1)-(11,1) | 903a(8,1)-(11,1) |
| ... | ... | ... | ... |
| 0x7 | 903a(28,0)-(31,0) | 903a(28,1)-(31,1) | 903a(28,2)-(31,2) |
| 0x8 | 903a(0,3)-(3,3) | 903a(0,4)-(3,4) | 903a(0,4)-(3,4) |
| ... | | | |
| 0x50 | 903a(0,30)-(3,30) | 903a(0,31)-(3,31) | 903b(0,0)-(3,0) |
| 0x51 | | | 903b(4,0)-(7,0) |
| 0x52 | | | 903b(8,0)-(11,0) |
| ... | | | ... |
| 0x57 | | | 903b(28,0)-(31,0) |

| ADDRESS | MEMORY 3 | MEMORY 4 | MEMORY 5 |
|---|---|---|---|
| 0x0 | 905a(0,0)-(3,0) | 905a(0,1)-(3,1) | 905a(0,2)-(3,2) |
| ... | ... | ... | ... |
| 0x3 | 905a(11,0)-(15,0) | 905a(11,1)-(15,1) | 905a(11,2)-(15,2) |
| 0x4 | 905a(0,3)-(3,3) | 905a(0,4)-(3,4) | 905a(0,5)-(3,5) |
| ... | ... | ... | ... |
| 0x14 | 905a(0,15)-(3,15) | 905b(0,0)-(3,0) | 905b(0,1)-(3,1) |
| ... | ... | ... | ... |
| 0x17 | | 905b(11,0)-(15,0) | |

OPERATION PROCESSING APPARATUS THAT CALCULATES ADDRESSES OF FEATURE PLANES IN LAYERS OF A NEUTRAL NETWORK AND OPERATION PROCESSING METHOD

BACKGROUND OF THE INVENTION

Field of the Invention

The present invention relates to a technique of calculating a feature plane in each layer of a hierarchical neural network by inputting input data to the hierarchical neural network to perform operation processing in the layer.

Description of the Related Art

A hierarchical operation method called a convolutional neural network (to be referred to as a CNN hereinafter) is receiving attention as a method of allowing pattern recognition robust to a variation of a recognition target. For example, various application examples and implementation examples are disclosed in Yann LeCun, Koray Kavukvuoglu and Clement Farabet: Convolutional Networks and Applications in Vision, Proc. International Symposium on Circuits and Systems (ISCAS'10), IEEE, 2010.

FIG. 9 is a view showing an example of the network configuration of a simple CNN. Reference numeral 901 denotes an input layer which corresponds to image data of a predetermined size when processing by the CNN is performed for the image data. Reference numerals 903a to 903d denote feature planes in a first layer 908; 905a to 905d, feature planes in a second layer 909; and 907, a feature plane in a third layer 910. The feature plane indicates a data plane corresponding to the processing result of a predetermined feature extraction operation (a convolution operation and nonlinear processing). The feature plane corresponds to a feature extraction result for recognizing a predetermined target in an upper layer, and is a processing result with respect to the image data, and thus the processing result is also represented by a plane. The feature planes 903a to 903d are generated by a convolution operation corresponding to the input layer 901 and nonlinear processing. For example, the feature plane 903a is calculated by a two-dimensional convolution operation schematically indicated by 9021a and nonlinear transformation of an operation result. For example, a convolution operation with a kernel (coefficient matrix) size of columnSize×rowSize is processed by a product-sum operation given by:

$$\text{output}(x, y) = \sum_{i=1}^{L} \sum_{\text{row}=-\text{rowSize}/2}^{\text{rowSize}/2} \sum_{\text{column}=-\text{columnSize}/2}^{\text{columnSize}/2} \text{input}(x + \text{column}, y + \text{row}) \times \text{weight}(\text{column}, \text{row}) \quad (1)$$

input(x, y): reference pixel value at coordinates (x, y)
output(x, y): operation result at coordinates (x, y)
weight(column, row): weighting coefficient used for operation of output(x, y)
columnSize, rowSize: convolution kernel size
L: the number of feature maps of preceding layer
In the processing by the CNN, the product-sum operation is repeated while scanning a plurality of convolution kernels on a pixel basis, and nonlinear transformation is performed for a final product-sum result, thereby calculating a feature plane. Note that when calculating the feature plane 903a, the number of connections with the preceding layer is one, and thus the number of convolution kernels is one. Reference numerals 9021b, 9021c, and 9021d denote convolution kernels used to calculate the feature planes 903b, 903c, 903d, respectively.

FIG. 10 is a view for explaining an example when the feature plane 905a is calculated. The feature plane 905a is connected to the feature planes 903a to 903d in the first layer 908 as the preceding layer of the second layer 909 to which the feature plane 905a belongs. When calculating data of the feature plane 905a, a convolution operation processing unit 1001 performs, for the feature plane 903a, a filter operation using a kernel schematically indicated by 9041a, and the result of the filter operation is held in an accumulator 1002. The convolution operation processing unit 1001 performs, for the feature planes 903b, 903c, and 903d, convolution operations by kernels denoted by reference numerals 9042a, 9043a, and 9044a, respectively, and the results of the filter operations are accumulated in the accumulator 1002. After the end of the four kinds of convolution operations, the accumulator 1002 performs accumulation of the four kinds of convolution operations. Then, a nonlinear transformation processing unit 1003 performs, for the result of the accumulation, nonlinear transformation processing using a logistic function or a hyperbolic tangent function (tanh function).

By performing the above processing for the entire image while scanning each pixel, the feature plane 905a is calculated. Similarly, the feature plane 905b is calculated by performing, for the feature planes in the first layer 908 as the preceding layer, convolution operations by four kernels denoted by reference numerals 9041b, 9042b, 9043b, and 9044b, accumulation, and nonlinear processing. The same applies to the feature planes 905c and 905d. Furthermore, the feature plane 907 is calculated using convolution operations by four kernels denoted by reference numerals 9061, 9062, 9063, and 9064 with respect to the feature planes 905a to 905d in the second layer 909 as the preceding layer. Note that each kernel coefficient is decided in advance by learning using a general method such as perceptron learning or back-propagation learning.

If network processing is performed by implementing, in an embedded system, CNN processing hardware for performing an operation using the CNN, the CNN processing hardware performs, for each layer, an operation using input data and a weighting coefficient. Then, the CNN processing hardware uses the result of the operation as input data to the next layer to repeatedly perform an operation with the weighting coefficient of the next layer, thereby obtaining a final pattern recognition result.

In the processing by the CNN, a number of convolution operations are repeated, and it is thus necessary to perform the product-sum operation an enormous number of times. As a result, the CNN processing hardware is required to execute the processing at high speed.

In a method described in Japanese Patent No. 5368687, an SRAM is provided in CNN processing hardware, and is used as an intermediate buffer that stores some or all of the feature planes 903a to 903d and 905a to 905d in the intermediated layers. Data read out from the intermediate buffer undergoes a convolution operation, and a processing result obtained by the convolution operation is stored in the intermediate buffer. By forming the intermediate buffer by the SRAM, the data access time is reduced, thereby improving the processing efficiency.

To further reduce the data access time, Japanese Patent Laid-Open No. 61-62187 and the like disclose techniques of increasing the speed by storing, in different memories, a plurality of lines necessary for a general filter operation, and simultaneously reading them out.

As described above, to efficiently perform a product-sum operation, the CNN processing hardware includes a plurality of SRAMs so as to simultaneously read out/write a plurality of data in a short access time, and then stores a plurality of lines in different memories and processes them.

On the other hand, the pattern recognition result output from the CNN processing hardware undergoes post-processing, thereby specifying the position coordinates of a detection target. Examples of the post-processing are correction processing for improving the accuracy of the detection position, extraction of the detection position, and processing of merging duplicate determination results. These processes can suppress erroneous detection, and improve the accuracy of the output pattern determination result. Since the post-processing is required to be flexible, processing by a general-purpose CPU is suitable. In general, the operation result output from the CNN processing hardware is transferred, by a DMAC or the like, to a shared memory used by the general-purpose CPU, and processed by the general-purpose CPU. Consequently, a time to transfer data to the shared memory is required and thus the processing performance deteriorates, or data is transferred to the shared memory via a bus and thus a bus band has no margin. In addition, the memory of the CNN processing hardware and the shared memory are separately required, thereby increasing the cost.

SUMMARY OF THE INVENTION

The present invention provides a technique in which when inputting input data to a hierarchical neural network to perform operation processing in each layer of the hierarchical neural network, it is possible to reduce the cost while speeding up the processing without degrading the processing performance.

According to the first aspect of the present invention, there is provided an operation processing apparatus for, by inputting input data to a hierarchical neural network and performing operation processing in each layer of the hierarchical neural network, calculating a feature plane in the layer, comprising: an operation unit; a feature plane holding unit including at least one memory that holds a feature plane to be processed by the operation unit; a memory access management unit configured to control to arrange the feature plane in the memory based on network information as information about each layer undergoing the operation processing and to manage reading/writing from/in the memory; and a processor configured to access, via a bus, the feature plane holding unit which is address-mapped in a memory space, wherein the processor calculates, based on the network information, an address address-mapped in the memory space, reads out the feature plane, and processes the feature plane.

According to the second aspect of the present invention, there is provided an operation processing method for an operation processing apparatus that, by inputting input data to a hierarchical neural network and performing operation processing in each layer of the hierarchical neural network, calculates a feature plane in the layer, wherein the operation processing apparatus includes an operation unit, a feature plane holding unit including at least one memory that holds a feature plane to be processed by the operation unit, a memory access management unit configured to control to arrange the feature plane in the memory based on network information as information about each layer undergoing the operation processing and to manage reading/writing from/in the memory, and a processor configured to access, via a bus, the feature plane holding unit which is address-mapped in a memory space, and the processor calculates, based on the network information, an address address-mapped in the memory space, reads out the feature plane, and processes the feature plane.

Further features of the present invention will become apparent from the following description of exemplary embodiments (with reference to the attached drawings).

BRIEF DESCRIPTION OF THE DRAWINGS

FIG. 4B is a view showing an example of a method of assigning a feature plane in a second layer 909 to memories of a feature plane holding unit 1021;

FIG. 5 is a view showing an example of a method of assigning the addresses of the feature planes in each memory assigned in accordance with the assigning method shown in FIGS. 4A and 4B;

DESCRIPTION OF THE EMBODIMENTS

Figure 1:
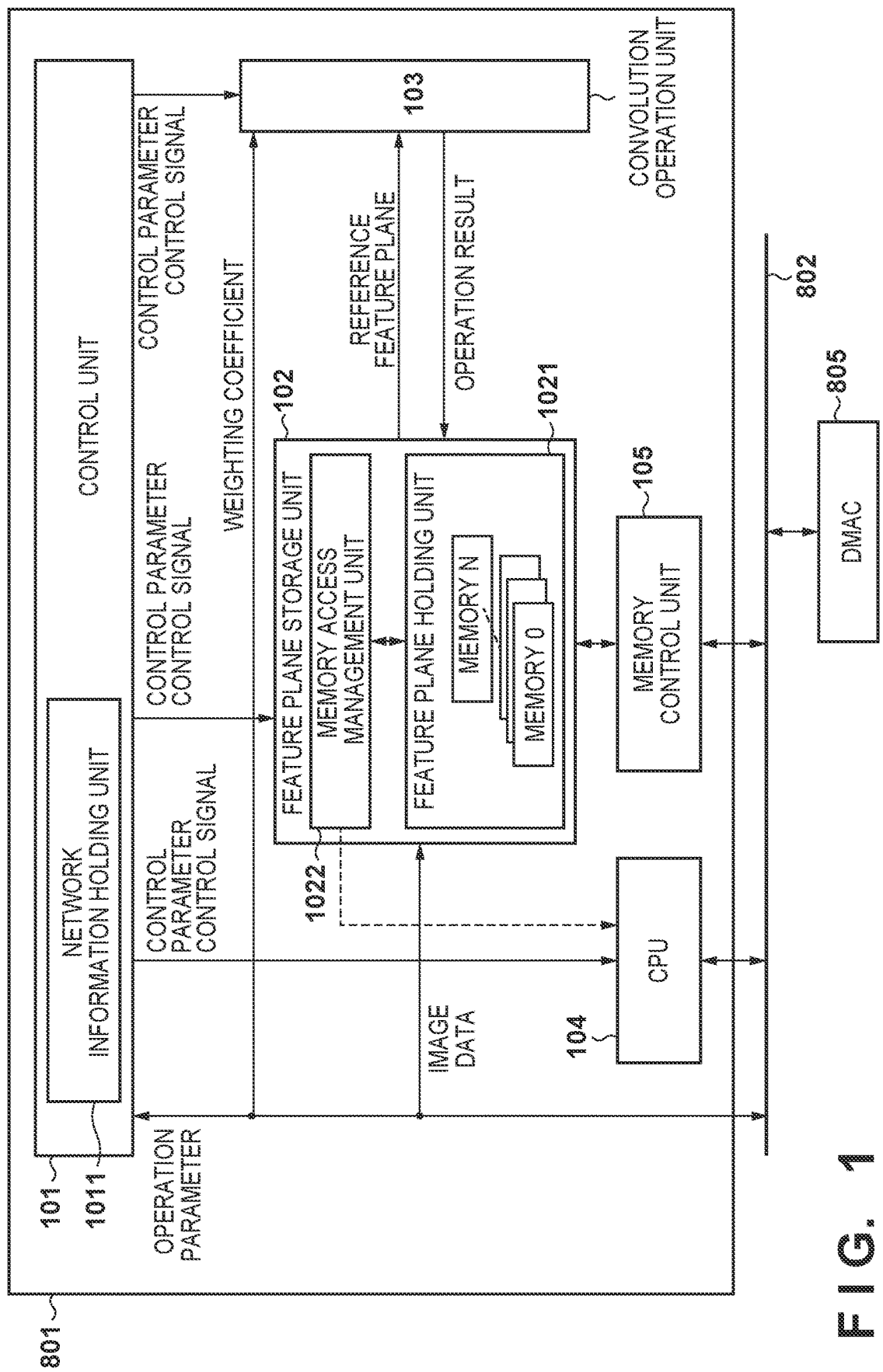
FIG. 1 is a block diagram showing an example of the hardware arrangement of a recognition processing unit 801.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 8:
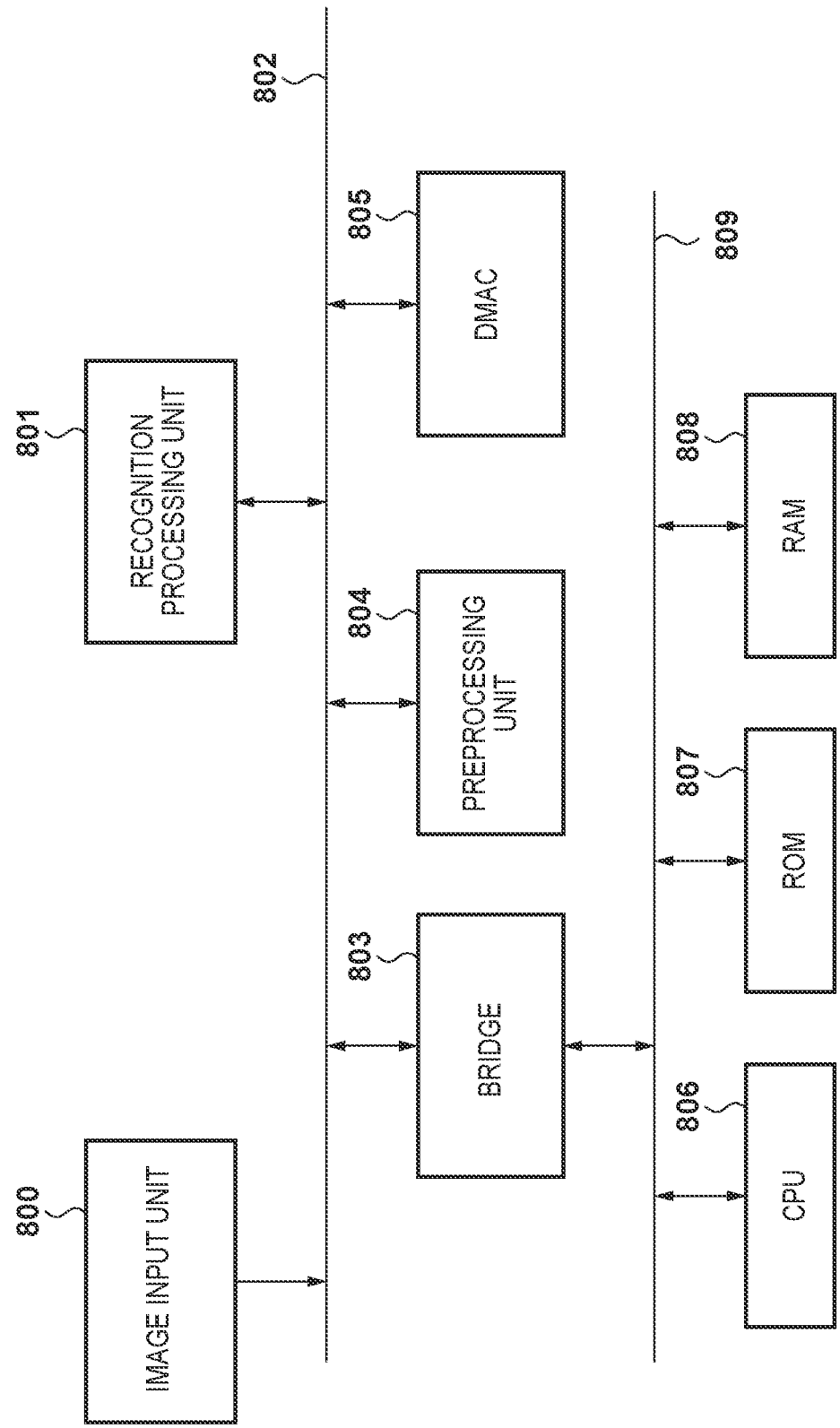
FIG. 8 is a block diagram showing an example of the hardware arrangement of the image processing system.

An example of the hardware arrangement of an image processing system using a recognition processing apparatus as an operation processing apparatus according to this embodiment will be described with reference to a block diagram shown in FIG. 8. The image processing system according to this embodiment has a function of detecting a region of a specific object from input image data.

An image input unit 800 acquires image data as input data by performing image capturing. The image data may be data of an image of each frame in a moving image or data of a still image. The image input unit 800 is formed by a driver circuit for controlling an optical system, a photoelectric conversion device such as a CCD (Charge-Coupled Devices) or CMOS (Complementary Metal Oxide Semiconductor) sensor, and a sensor, an AD converter, a signal processing circuit for controlling various kinds of image correction, a frame buffer, and the like.

A recognition processing unit 801 includes the recognition processing apparatus as the operation processing apparatus according to this embodiment, and detects a region of a specific object from the image data obtained by the image input unit 800. A DMAC (Direct Memory Access Controller) 805 controls data transfer between each processing unit on an image bus 802 and each processing unit on a CPU bus 809.

A bridge 803 provides the bridge function between the image bus 802 and the CPU bus 809.

A preprocessing unit 804 performs various kinds of preprocessing for effectively executing recognition processing by the recognition processing unit 801. More specifically, with respect to the image data acquired by the image input unit 800, the preprocessing unit 804 processes image transformation processing such as color transformation processing and contrast correction processing by hardware.

A CPU 806 executes various kinds of processing using computer programs and data stored in a ROM 807 and a RAM 808. Thus, the CPU 806 controls the operation of the overall image processing system, and also executes or controls each processing to be described later as that executed by the image processing system.

The ROM (Read Only Memory) 807 stores data and a computer program including a command that defines the operation of the CPU 806. In the following description, information processed as information known by the image processing system is stored in the ROM 807. The data stored in the ROM 807 includes a data set (an operation parameter and a weighting coefficient corresponding to a CNN as an example of the hierarchical neural network) for operating the recognition processing unit 801. This data set is input to the recognition processing unit 801 via the DMAC 805.

The RAM 808 has an area to store the computer program and data loaded from the ROM 807, an area to hold the image data acquired by the image input unit 800, an area to temporarily hold data to be processed, and the like. The RAM 808 also has a work area used by the CPU 806 to execute various kinds of processing. As described above, the RAM 808 can appropriately provide various kinds of areas.

The image data acquired by the image input unit 800 undergoes preprocessing in the preprocessing unit 804, is temporarily stored in the RAM 808, and is then transferred (input) to the recognition processing unit 801 by the DMAC 805. The recognition processing unit 801 performs predetermined determination processing for each pixel of the input image data having undergone the preprocessing, thereby detecting the region of the specific object in the image represented by the image data. Information (information for defining the region in the image, an image in the region, or the like) concerning the region detected by the recognition processing unit 801 is transferred to the RAM 808 by the DMAC 805, and stored in the RAM 808.

An example of the hardware arrangement of the recognition processing unit 801 will be described next with reference to a block diagram shown in FIG. 1. A control unit 101 controls the overall recognition processing unit 801. The control unit 101 includes a network information holding unit 1011, and network information is set (stored) in the network information holding unit 1011. The DMAC 805 transfers, to the network information holding unit 1011, network information stored in advance in the ROM 807, and sets it. The network information includes the number of layers to be processed, the number of each layer, feature plane information (the width and height of each feature plane and the number of feature planes) for each layer, and information (the horizontal and vertical sizes of a convolution kernel) of connection between the layers.

The control unit 101 also includes an enable register as a register for operation control, and the CPU 806 instructs to start processing. The CPU 806 instructs the control unit 101 to start processing of a plurality of layers, and the control unit 101 instructs a feature plane storage unit 102 and a convolution operation unit 103 (both of which will be described later) to start processing for each layer a plurality of times. The control unit 101 transmits, as control parameters, network information set (held) in the network information holding unit 1011 together with a control signal indicating a processing start instruction.

If post-processing is performed for the generated feature planes in each layer, after completion of the processing for each layer in the feature plane storage unit 102 and the convolution operation unit 103, the control unit 101 transmits, as control parameters, to a CPU 104, the network information set in the network information holding unit 1011. Then, the control unit 101 issues a processing start instruction.

The feature plane storage unit 102 is used to store the feature planes, and includes a feature plane holding unit 1021 and a memory access management unit 1022 that controls processing of reading/writing the data from/in the feature plane holding unit 1021.

The feature plane holding unit 1021 includes (N+1) (N is an integer of 1 or more) dual-port SRAMs (memories 0 to N). In the following description, as an example, N=5 is set. That is, the following description assumes that the feature plane holding unit 1021 includes six dual-port SRAMs (memories 0 to 5). Assume also that the data width of each SRAM is 4 bytes.

The memory access management unit 1022 controls one port of the interfaces of each dual-port SRAM. The memory access management unit 1022 decides the arrangement, in the six dual-port SRAMs, of the generated feature planes in each layer as the operation result of the convolution operation unit 103 based on the control parameters (the network information of the layer) received from the control unit 101, and then writes the feature planes in the dual-port SRAMs. Furthermore, the memory access management unit 1022 reads out a reference feature plane and transmits it to the convolution operation unit 103. Upon receiving, from the convolution operation unit 103, all the feature planes in the layer to be generated, the memory access management unit 1022 notifies the control unit 101 of completion.

The convolution operation unit 103 is used to perform a convolution operation, and receives the reference feature plane and the weighting coefficient corresponding to a filter kernel size to output a feature plane as an operation result. The DMAC 805 transfers, to the convolution operation unit 103, the weighting coefficient arranged in advance in the ROM 807. The convolution operation unit 103 receives the filter kernel size as a control parameter from the control unit 101, performs operation processing upon receiving a processing start instruction, and notifies the control unit 101 of completion upon completion of the operation processing of all the feature planes in the layer to be generated.

The CPU 104 performs post-processing of the feature planes. The CPU 104 serves as the bus master of the image bus 802, and the memories of the feature plane holding unit 1021 are address-mapped in a memory space via a memory control unit 105 (to be described later). Upon receiving the processing start instruction from the control unit 101, data is acquired based on the network information of the processing target layer, and processed.

The memory control unit 105 is used to control processing of reading/writing data from/in the dual-port SRAMs of the feature plane holding unit 1021, and controls one port of the interfaces of each of the six dual-port SRAMs of the feature plane holding unit 1021. The memory control unit 105 serves as the bus slave of the image bus 802, and receives a request from the bus master and reads/writes data from/in the memories.

Figure 2:
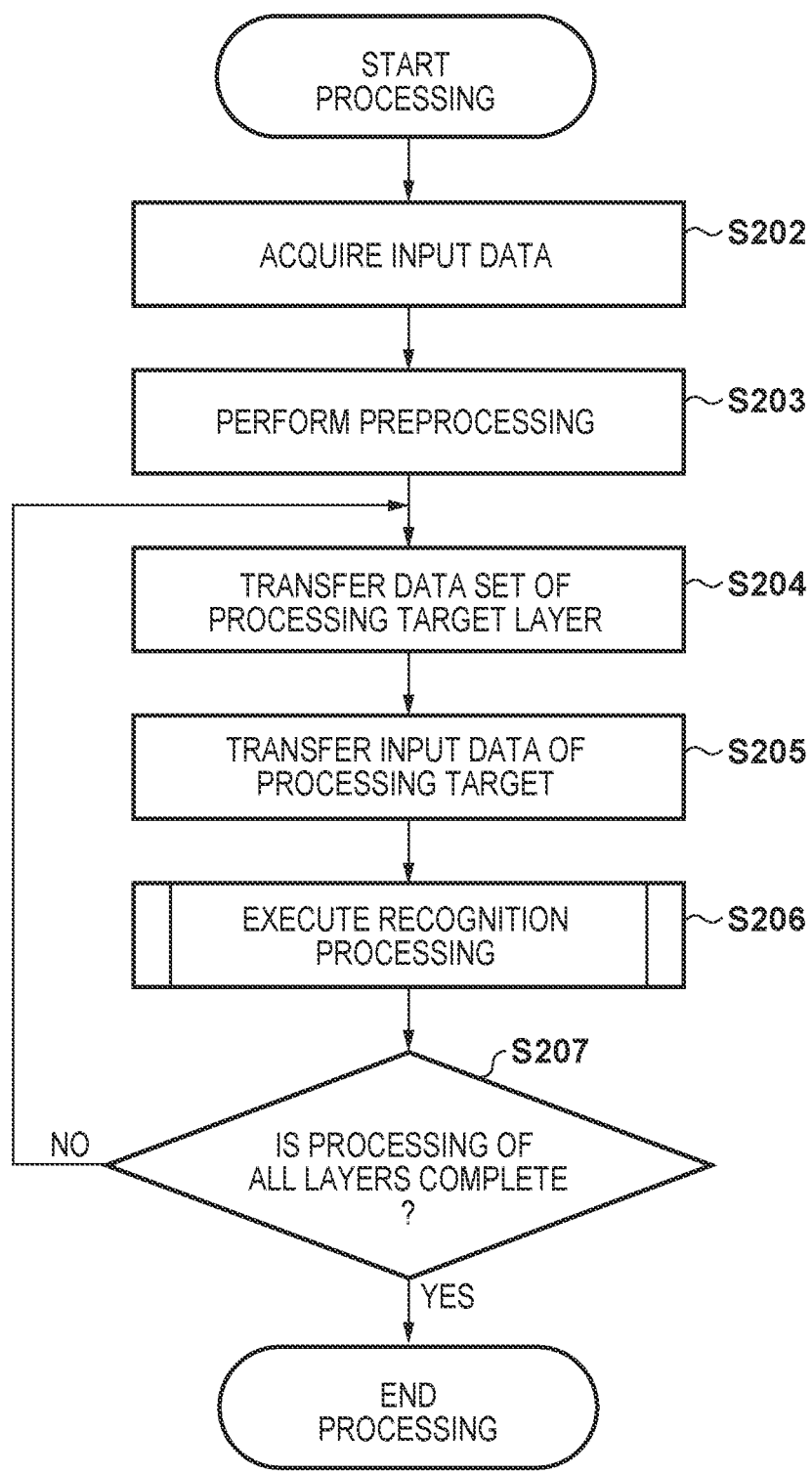
FIG. 2 is a flowchart illustrating the overall operation of an image processing system.

The overall operation of the image processing system will be described next with reference to a flowchart shown in FIG. 2. In step S202, the CPU 806 acquires image data (input data) via the image input unit 800. In step S203, the preprocessing unit 804 performs preprocessing for the image data acquired in step S202, and stores the image data in the RAM 808.

In step S204, the CPU 806 sets, in the DMAC 805, the start position address of the data set of a processing target layer stored in the ROM 807, and activates the DMAC 805. The number of processing target layers may be one or more. Thus, the DMAC 805 reads out the data set of the processing target layer from the set start address, and transfers it.

After completion of transfer, in step S205, the CPU 806 sets again, in the DMAC 805, the start position address of data having undergone the preprocessing in the RAM 808, and activates the DMAC 805. Thus, the DMAC 805 reads out the data having undergone the preprocessing from the set start address, and transfers it.

In step S206, since the CPU 806 activates the recognition processing unit 801, the recognition processing unit 801 executes processing. Upon completion of the processing of the recognition processing unit 801, the result (a detection result or feature data in an intermediate layer) of the processing is stored again in the RAM 808.

In step S207, the CPU 806 determines whether the processing of all the layers is complete. If, as a result of the determination processing, the processing of all the layers is complete, the processing according to the flowchart of FIG. 2 ends. On the other hand, if the layer which has not been processed remains, the process advances to step S204 to perform the processing in step S204 and the subsequent steps for the layer which has not been processed.

In a small-scale neural network for an embedded apparatus, it is possible to process all the layers at once. Therefore, in this case, it is determined in step S207 that "the processing of all the layers is complete", and the processing according to the flowchart of FIG. 2 ends. On the other hand, in a large-scale neural network, since it is impossible to process all the layers at once, the neural network is time-divisionally processed. In this case, if it is determined in step S207 that the layer which has not undergone the time-divisionally performed processing remains, the process advances to step S204 to perform the processing for the remaining layer. The second or subsequent processing in step S205 transfers, as processing target data, the processing result of the recognition processing unit 801 stored in the RAM 808.

Figure 3:
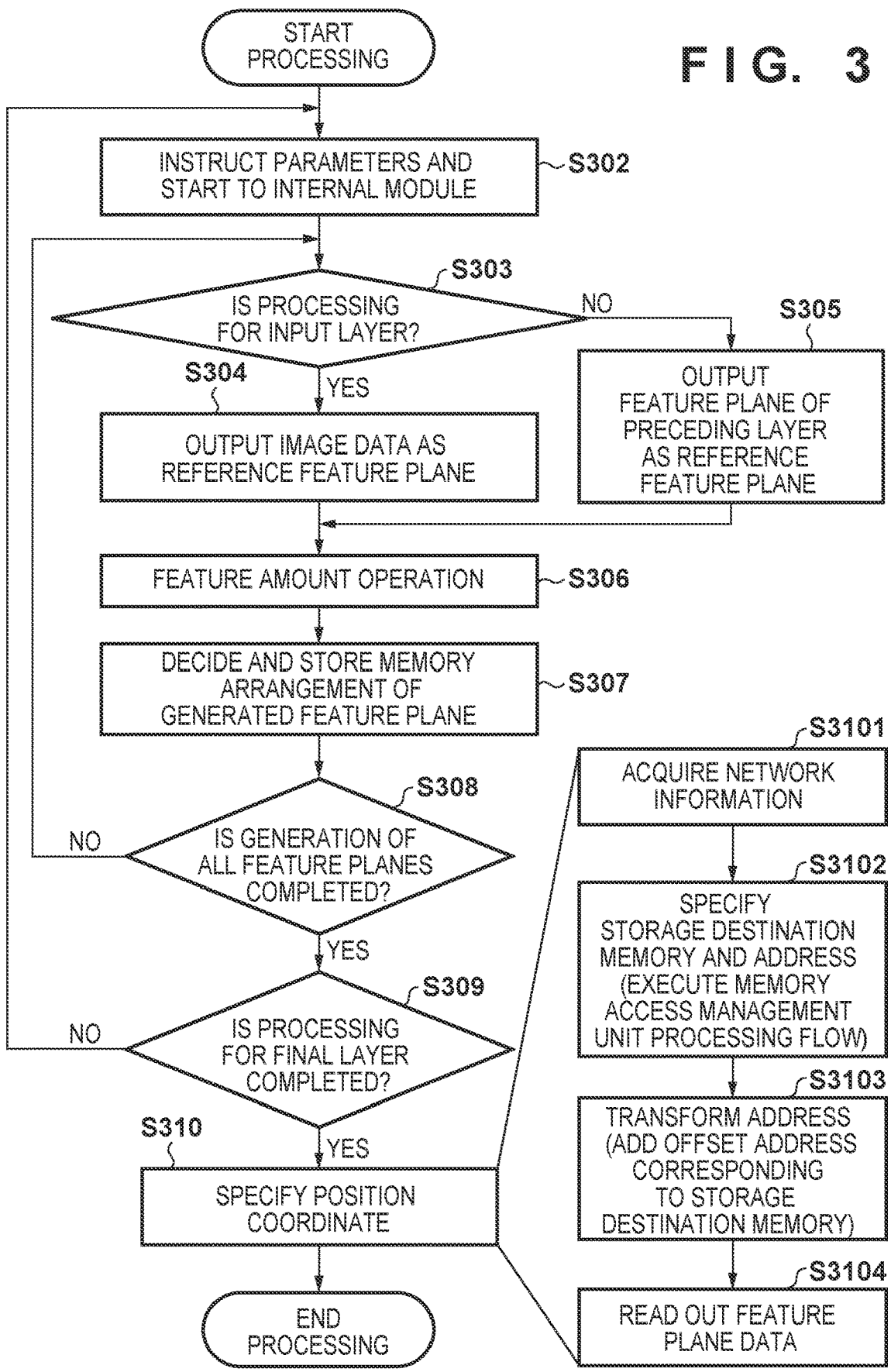
FIG. 3 is a flowchart illustrating details of processing in step S206.

Details of the processing in step S206 will be described next with reference to a flowchart shown in FIG. 3. The control unit 101 controls the overall processing. Upon completion of the processing in step S205, information concerning the processing target layer of the recognition processing unit 801 is set in the network information holding unit 1011.

In step S302, the control unit 101 transmits, as control parameters, the information held in the network information holding unit 1011 to the feature plane storage unit 102 and the convolution operation unit 103 for each layer, and issues a processing start instruction.

In step S303, the feature plane storage unit 102 determines whether the processing is performed for the input layer. If, as a result of the determination processing, the processing is performed for the input layer, the process advances to step S304. If the processing is performed for a layer other than the input layer, the process advances to step S305.

In step S304, the feature plane storage unit 102 outputs the image data as a reference feature plane. On the other hand, in step S305, the feature plane storage unit 102 reads out the feature plane in the preceding layer from the feature plane holding unit 1021, and outputs it as a reference feature plane.

In step S306, the convolution operation unit 103 performs a convolution operation based on the reference feature plane and the weighting coefficient, and transfers an operation result to the feature plane storage unit 102. In step S307, the memory access management unit 1022 decides the memory arrangement of the generated feature plane, and stores the feature plane in the feature plane holding unit 1021 in accordance with the decided memory arrangement. Details of the memory arrangement will be described later with reference to FIGS. 4A to 6.

In step S308, the feature plane storage unit 102 determines whether all feature planes have been generated. If, as a result of the determination processing, all the feature planes have been generated, the process advances to step S309. On the other hand, if a feature plane which has not been generated yet remains, the process advances to step S303 to perform processing in step S303 and the subsequent steps for the feature plane which has not been generated yet.

In step S309, the feature plane storage unit 102 and the convolution operation unit 103 output a completion notification to the control unit 101. Upon receiving the completion notification, the control unit 101 determines whether the processing of the final layer is complete.

If, as a result of the determination processing, the processing of the final layer is complete, the process advances to step S310; otherwise, the process returns to step S302 and the control unit 101 instructs processing of the next layer.

In step S310, if the processing of the final layer is complete, the control unit 101 gives the network information such as the number of the final layer to the CPU 104, and issues a processing start instruction. The CPU 104 reads out the feature plane in the final layer based on the network information, specifies position coordinates, and then ends the processing. Details (steps S3101 to S3104) of the processing in step S310 will be described later.

Figure 4A:
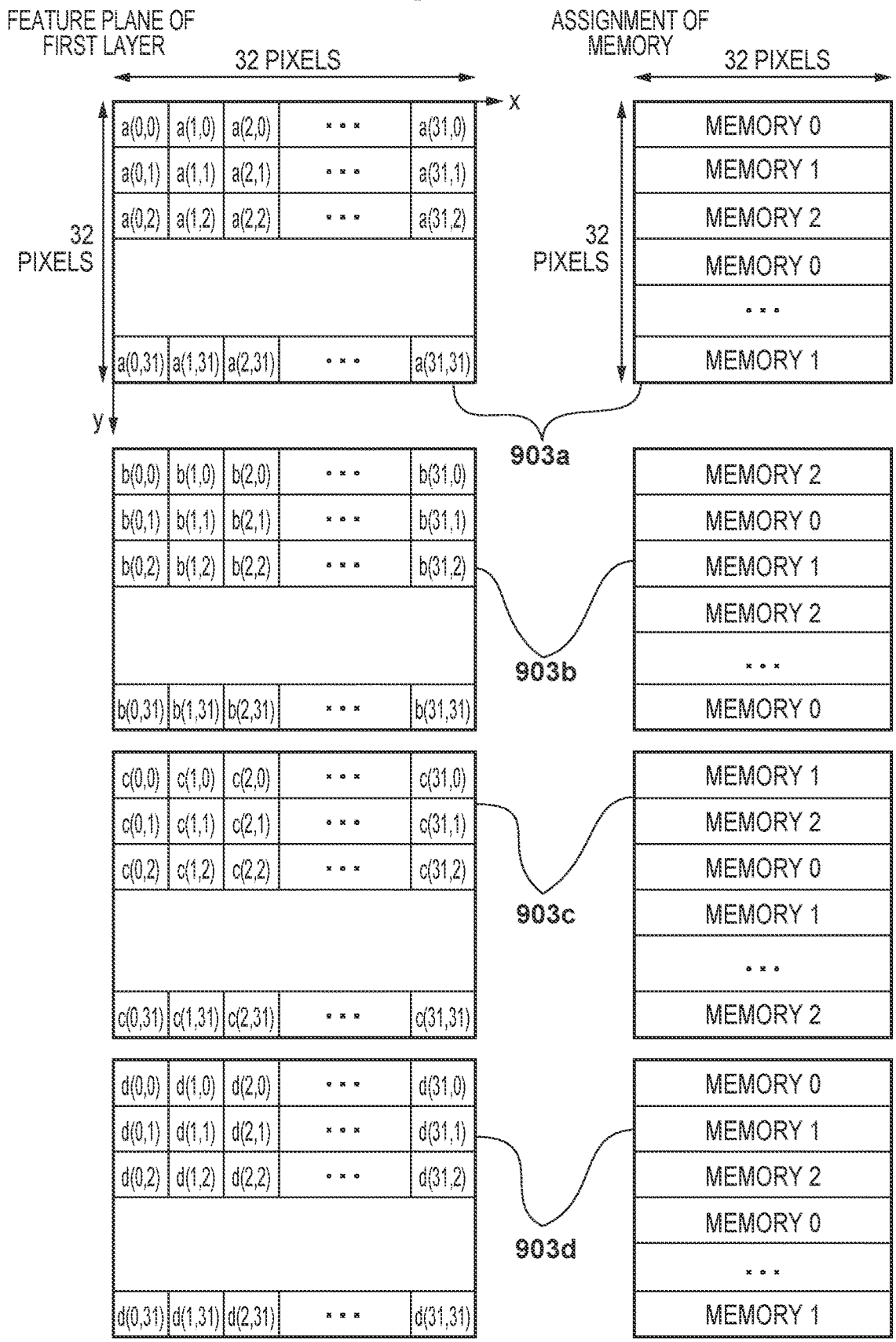
FIG. 4A is a view showing an example of a method of assigning a feature plane in a first layer 908 to memories of a feature plane holding unit 1021.
Figure 9:
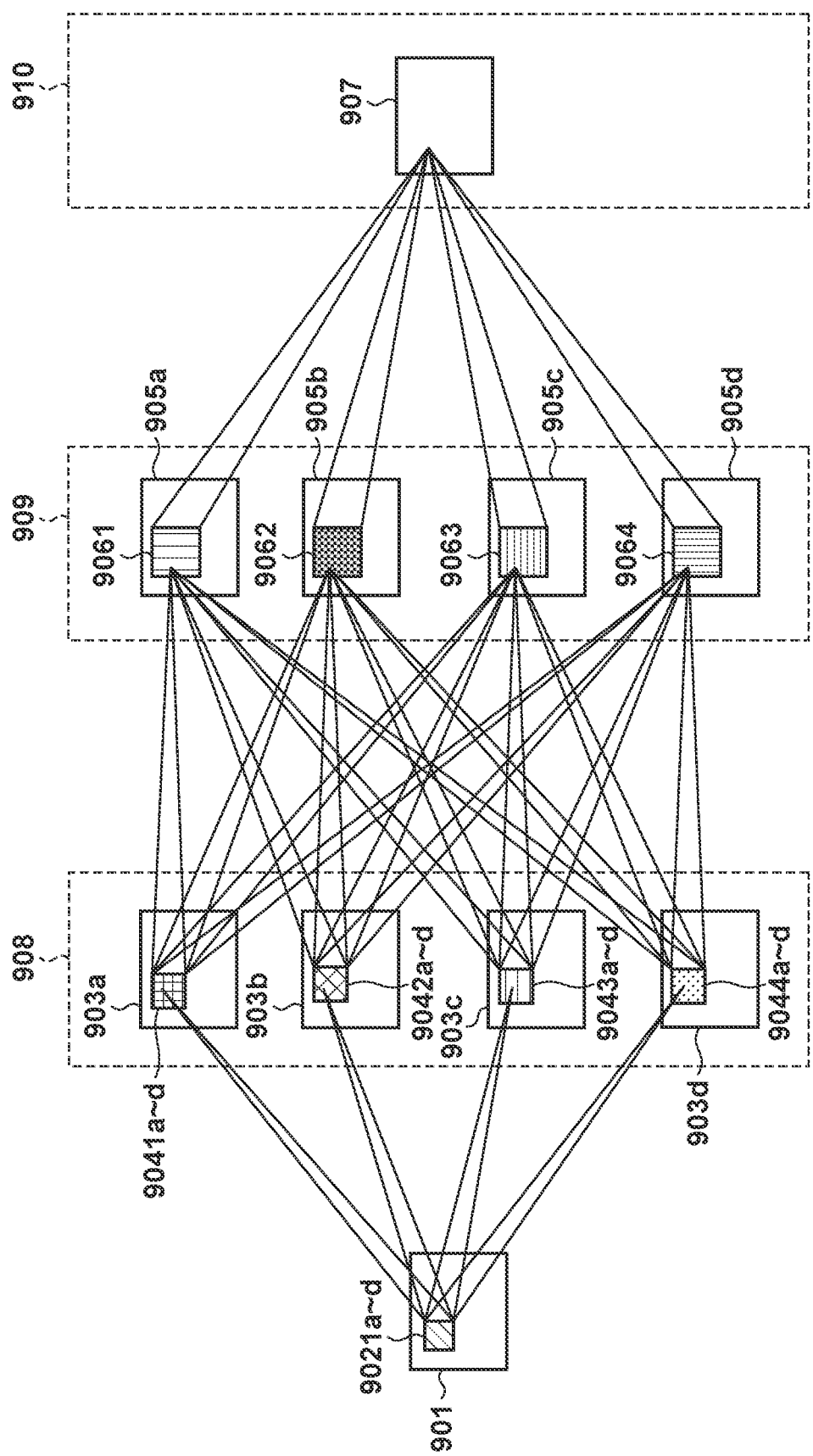
FIG. 9 is a view showing an example of the network configuration of a simple CNN.
Figure 10:
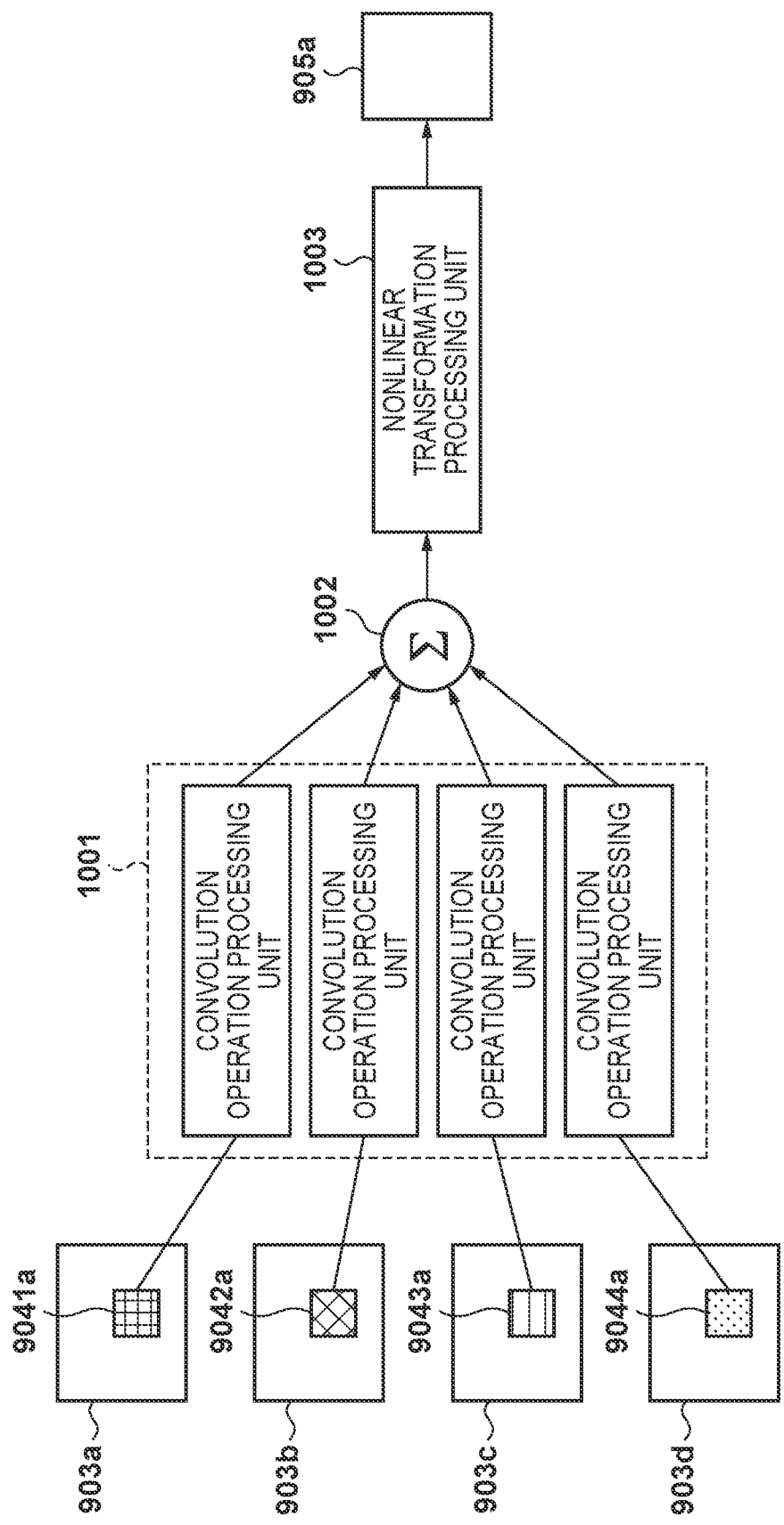
FIG. 10 is a view for explaining an example when calculating a feature plane 905*a*.

The memory arrangement controlled by the memory access management unit 1022 will be described next with reference to FIGS. 4A to 6. FIGS. 4A and 4B are views showing an example of an assigning method of assigning the feature planes in the first layer 908 and the second layer 909 in FIG. 9 to the memories of the feature plane holding unit 1021, respectively.

The feature planes in the feature plane storage unit 102 are interleaved in a plurality of memories on a layer basis. In addition, the feature planes in the feature plane storage unit 102 are interleaved in a plurality of memories on a line basis.

In FIGS. 4A and 4B, the pixel values of the feature planes 903a to 903d in the first layer 908 and the feature planes 905a to 905d in the second layer 909 are shown on the left side. When a position at the upper left corner of the feature plane 903a is represented by (0, 0), the pixel value of the feature plane 903a at a position (x, y) is represented by a(x, y). When a position at the upper left corner of the feature plane 903b is represented by (0, 0), the pixel value of the feature plane 903b at the position (x, y) is represented by b(x, y). When a position at the upper left corner of the feature plane 903c is represented by (0, 0), the pixel value of the feature plane 903c at the position (x, y) is represented by c(x, y). When a position at the upper left corner of the feature plane 903d is represented by (0, 0), the pixel value of the feature plane 903d at the position (x, y) is represented by d(x, y). When a position at the upper left corner of the feature plane 905a is represented by (0, 0), the pixel value of the feature plane 905a at the position (x, y) is represented by a(x, y). When a position at the upper left corner of the feature plane 905b is represented by (0, 0), the pixel value of the feature plane 905b at the position (x, y) is represented by b(x, y). When a position at the upper left corner of the feature plane 905c is represented by (0, 0), the pixel value of the feature plane 905c at the position (x, y) is represented by c(x, y). When a position at the upper left corner of the feature plane 905d is represented by (0, 0), the pixel value of the feature plane 905d at the position (x, y) is represented by d(x, y).

Referring to FIGS. 4A and 4B, the sizes in the horizontal and vertical directions of each feature plane in the first layer 908 are respectively 32 pixels, and the sizes in the horizontal and vertical directions of each feature plane in the second layer 909 are respectively 16 pixels. Data of the pixel value at one coordinate point is assumed to be 1 byte. In FIGS. 4A and 4B, an example of a method of assigning each feature plane to the memories is shown on the right side.

The memory group of the feature plane holding unit 1021 is divided into two groups. One of the groups is set as the first memory group and the other group is set as the second memory group. In this embodiment, since the feature plane holding unit 1021 includes the six dual-port SRAMs (memories 0 to 5), memories 0 to 2 are set as the first memory group and memories 3 to 5 are set as the second memory group. The feature planes are alternately arranged in the first and second memory groups on a layer basis. This can arrange the input feature planes and the output feature planes in different memories to simultaneously read out and write data, thereby performing processing at high speed. Furthermore, the lines (each pixel group with the same y-coordinate is called a line) of one feature plane are assigned to different memories, respectively. That is, in this embodiment, successive three lines of each feature plane are arranged in different memories. Thus, if the convolution kernel has a size of 3×3 or less, the pixels of the reference feature plane input to the convolution operation unit 103 can simultaneously be read out, thereby performing the processing at high speed. If the convolution kernel has a size larger than 3×3, the pixels can be read out in two cycles.

In accordance with the above description, as shown on the right side of FIGS. 4A and 4B, memories 0, 1, and 2 are alternately assigned to the feature planes 903a to 903d in the first layer 908 on a line basis. Since the memory assigned to the final line of the feature plane 903a is memory 1, memory 2 as the next memory is assigned to the first line of the feature plane 903b. To efficiently use the memories, even when crossing the feature planes, the memories are assigned, similar to the successive lines. Similarly, memories 1, 2, and 0 are alternately assigned to the feature plane 903c on a line basis, and memories 0, 1, and 2 are alternately assigned to the feature plane 903d on a line basis.

Memories 3, 4, and 5 are alternately assigned to the feature planes 905a to 905d in the second layer 909 on a line basis. Since the memory assigned to the final line of the feature plane 905a is memory 3, memory 4 as the next memory is assigned to the first line of the feature plane 905b. To efficiently use the memories, even when crossing the feature planes, the memories are assigned, similar to the successive lines. Similarly, memories 3, 4, and 5 are alternately assigned to the feature plane 905c on a line basis, and memories 3, 4, and 5 are alternately assigned to the feature plane 905d on a line basis.

FIG. 5 is a view showing an example of a method of assigning the addresses of the feature planes in each memory assigned in accordance with the assigning method shown in FIGS. 4A and 4B. Since each memory has a data width of 4 bytes, data of 4 pixels is stored at one address. A pixel with a smaller x-coordinate is stored in a lower byte.

In memory 0, the pixel values of 32 pixels of the feature plane 903a are stored at a 3-line offset. For example, the pixel values of the pixels of the first line are stored at addresses 0 to 0x7, the pixel values of the pixels of the fourth line are stored at addresses 0x8 to 0xf, and the pixel values of the pixels of the seventh line are stored at addresses 0x10 to 0x17. The data size of the pixel values of the 32 pixels is 32 bytes.

After storing the pixel values for 11 lines of the feature plane 903a, the pixel values of the pixels of the second line of the feature plane 903b are stored from the next address 0x58. Similarly, the pixels values of the feature planes 903c and 903d are stored. In memory 1, 32 pixels are sequentially stored, at addresses 0 to 0x7, from data of the second line of the feature plane 903a at a 3-line offset. Then, the pixel values are also stored with respect to the feature planes 903b to 903d. The pixel values of the feature planes 903a to 903d are similarly stored in memory 2. The pixel values (16 bytes) of the 16 pixels of the feature planes 905a to 905d in the second layer 909 are similarly stored at a 3-line offset in memories 3 to 5.

A method of deciding, in step S307 described above, a memory in which the memory access management unit 1022 stores a pixel value at the coordinates (x, y) of a feature plane with a feature plane number n, and its address will be described next with reference to a flowchart shown in FIG. 6.

In step S302, the control unit 101 transmits, as control parameters, to the feature plane storage unit 102 and the convolution operation unit 103, the layer number of the processing target and generation target layer, the horizontal size w and the vertical size h of each feature plane, and the number of feature planes on a layer basis. The convolution operation unit 103 outputs data of all the feature planes in the raster order. After the convolution operation unit 103 outputs the data, the processing according to the flowchart shown in FIG. 6 starts.

In step S602, the memory access management unit 1022 obtains a serial number L of each of the lines in all the feature planes with the feature plane number n at the coordinates (x, y) by calculating $L=(n-1) \times h + y$.

In step S603, the memory access management unit 1022 decides a storage destination memory number mem by performing a remainder operation for the serial number L in accordance with the number of memories of the feature plane holding unit 1021. That is, the memory access management unit 1022 obtains the storage destination memory number mem by calculating mem=mod(L, (the number of memories/2)).

If mem=0 (a remainder operation result is 0), the process advances to step S604. In step S604, the memory access management unit 1022 determines whether the layer number of the generation target layer is an odd number. If the layer number is an odd number, the process advances to step S605; otherwise, the process advances to step S606. In step S605, the memory access management unit 1022 stores the pixel value in memory 0. In step S606, the memory access management unit 1022 stores the pixel value in memory 3.

If mem=1 (the remainder operation result is 1), the process advances to step S607. In step S607, the memory access management unit 1022 determines whether the layer number of the generation target layer is an odd number. If the layer number is an odd number, the process advances to step S608; otherwise, the process advances to step S609. In step S608, the memory access management unit 1022 stores the pixel value in memory 1. In step S609, the memory access management unit 1022 stores the pixel value in memory 4.

If mem=2 (the remainder operation result is 2), the process advances to step S610. In step S610, the memory access management unit 1022 determines whether the layer number of the generation target layer is an odd number. If the layer number is an odd number, the process advances to step S611; otherwise, the process advances to step S612. In step S611, the memory access management unit 1022 stores the pixel value in memory 2. In step S612, the memory access management unit 1022 stores the pixel value in memory 5.

As described above, by deciding the storage destination of the pixel value, a memory from which a reference feature plane is read out and a memory in which a generated feature plane is written are separate when generating a layer of an even number from a layer of an odd number. Similarly, when generating a layer of an odd number from a layer of an even number, a memory from which a reference feature plane is read out and a memory in which a generated feature plane is written are separate. The respective lines of the generated feature planes are stored in different memories in order of serial numbers of the lines. When loading the feature planes as reference feature planes, a plurality of lines can simultaneously be loaded.

In step S613, the memory access management unit 1022 calculates an address in the memory. An address A0 at which the start pixel of the first line is stored is obtained by calculating A0=L/(the number of memories/2)×w/4, and an address A1 is obtained by calculating A0+x/4.

Figure 7:
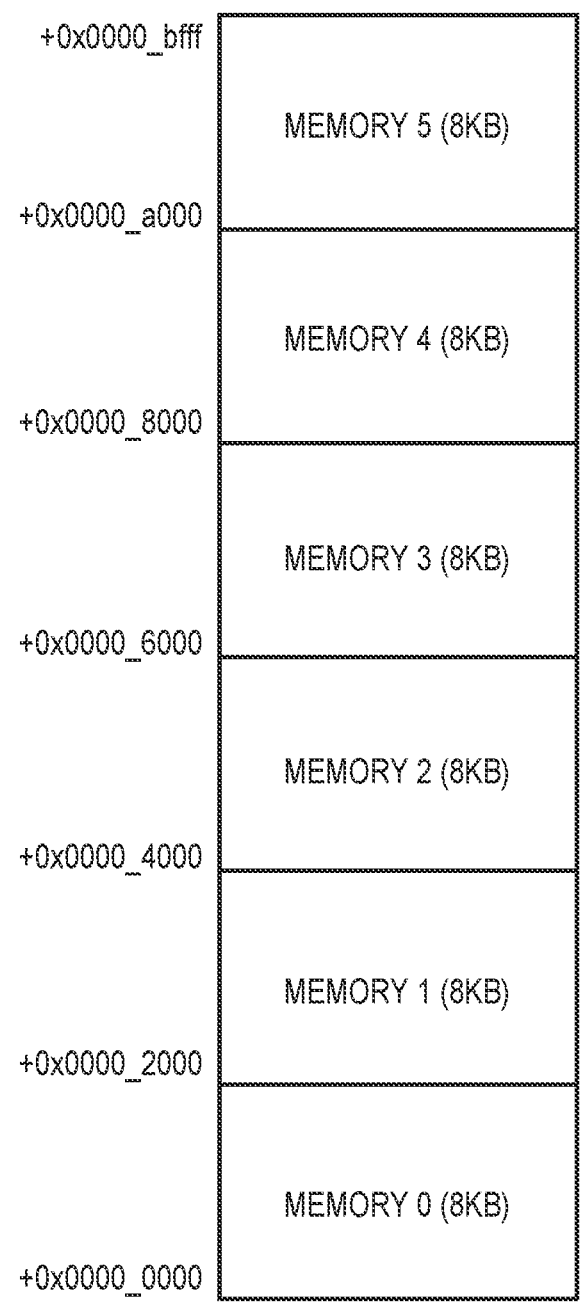
FIG. 7 is a view showing part of the memory map of a CPU 104.

Details of the processing in step S310 will be described next. FIG. 7 is a view showing part of the memory map of the CPU 104. Memories 0 to 5 are 8-KB memories, and are assigned to a continuous 48-KB region from a specific base address. The start address of memory 0 is an address 0, and the start addresses of memory 1 and the subsequent memories are obtained by adding 0x2000 to the address of the start address of the preceding memory.

The memory control unit 105 selects the chip select of the memory in accordance with the address of an access request. For example, the chip select of memory 0 is selected for an access request to addresses 0 to 0x1FFF, and the chip select of memory 1 is selected for an access request to addresses 0x2000 to 0x3FFF. An address in the memory is [13:2] of the address of the access request.

In step S3101, the CPU 104 acquires the network information. The control unit 101 transfers, as control parameters, the layer number of the final layer, the horizontal size w and the vertical size h of each feature plane, and the number of feature planes, and the CPU 104 refers to these control parameters.

Figure 6:
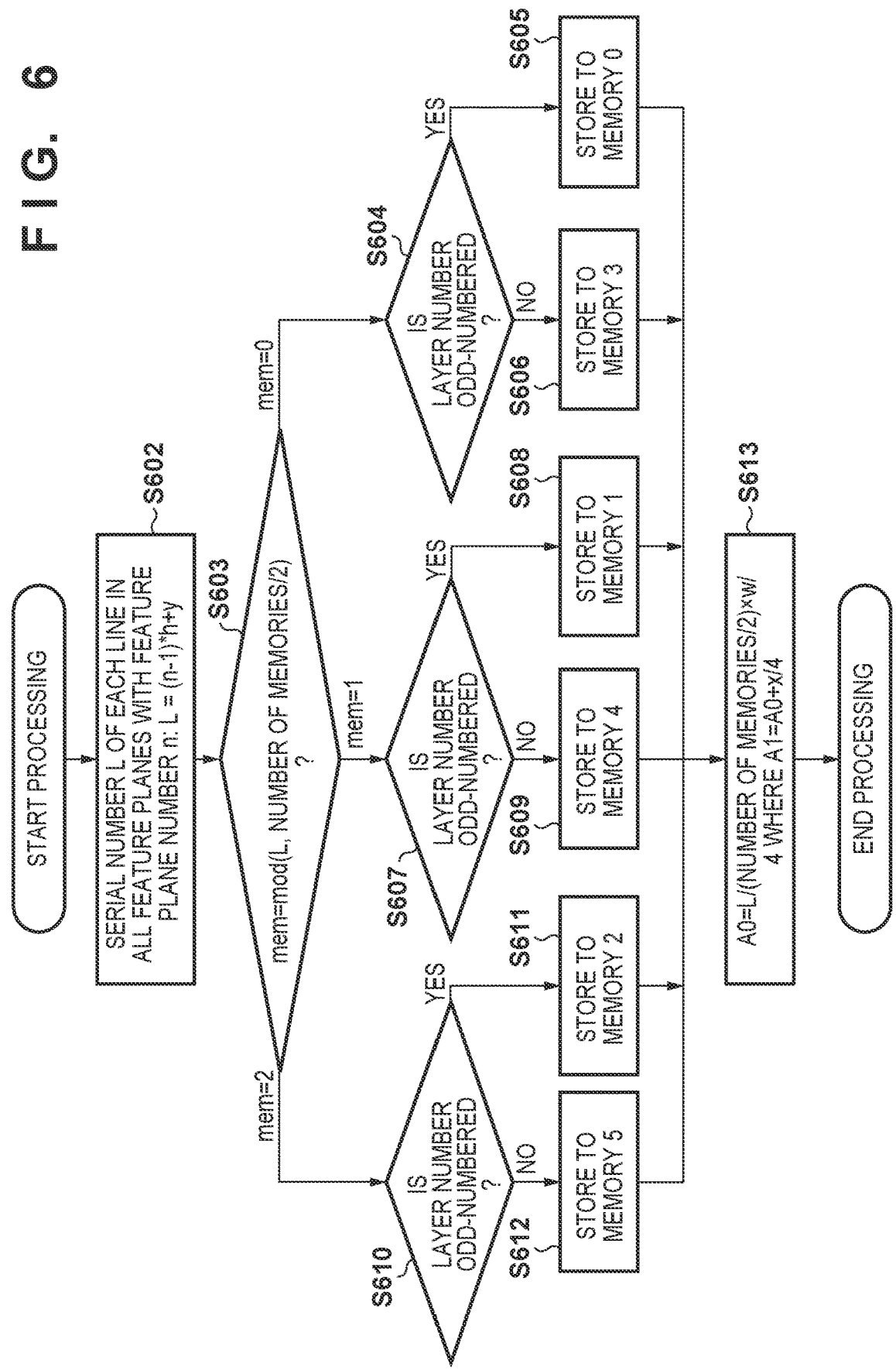
FIG. 6 is a flowchart illustrating processing in step S307.

In step S3102, to read out the pixel value of the feature plane with the feature plane number n at the coordinates (x, y), the processing according to the flowchart shown in FIG. 6 is executed, thereby specifying the storage memory and the address A1. The processing according to the flowchart shown in FIG. 6 may be performed by the CPU 104 or the memory access management unit 1022.

In step S3103, the CPU 104 performs the following transformation processing to acquire an address on the memory map from the storage memory and the address A1 specified in step S3102.

When storage memory is memory 0, address=A1×4

When storage memory is memory 1, address=A1×4+0x2000

When storage memory is memory 2, address=A1×4+0x4000

When storage memory is memory 3, address=A1×4+0x6000

When storage memory is memory 4, address=A1×4+0x8000

When storage memory is memory 5, address=A1×4+0xa000

In step S3104, the CPU 104 issues, by the transformed address, an access request to the memory control unit 105, and acquires the pixel value of the feature plane read out in accordance with the access request, thereby specifying position coordinates.

As described above, according to this embodiment, it is possible to eliminate the time to perform data transfer to the shared memory and reduce the bas band. The memory of the hardware (CNN processing hardware) that performs CNN processing is the address mapped memory of the CPU.

Therefore, when the CNN processing hardware does not operate, the memory can be used as the work memory of the CPU, and it is unnecessary to additionally provide the work memory, thereby reducing the cost.

Second Embodiment

The difference from the first embodiment will be described below, and the rest is assumed to be the same as in the first embodiment unless it is specifically stated otherwise. An example of the arrangement of a recognition processing unit 801 according to this embodiment will be described with reference to a block diagram shown in FIG. 11.

This embodiment assumes that feature planes in a processing target layer are successively stored in the raster order from a start address 0 in a continuous 48-KB region on a memory map. That is, in accordance with a horizontal size w and a vertical size h of each feature plane, an address A2 on the memory map of data of a feature plane with a feature plane number n at coordinates (x, y) is decided by:

$$A2 = w \times h \times n(\text{feature plane offset}) \times y \times w(\text{line offset}) + x$$

A memory control unit 1051 uses an access request address as an address signal of an SRAM in an arrangement including one SRAM interface (one chip select). The SRAM interface is connected to a memory access management unit 1024. In step S310, the memory access management unit 1024 is notified of SRAM access to A2.

Assume that a feature plane holding unit 1023 is a single-port SRAM. If an access request is received from the SRAM interface of the memory control unit 1051, the memory access management unit 1024 specifies the feature plane number n and the coordinates (x, y) from the address, the horizontal size w and the vertical size h of the feature plane, and a layer number. Then, the storage destination memory and address are decided in accordance with the flowchart shown in FIG. 6, and data is read out from the memory. The read data is output to the memory control unit 1051.

As described above, in this embodiment, a CPU 104 that performs post-processing for an operation result output from CNN processing hardware issues an access request to a specific address on the memory map in accordance with the horizontal size and the vertical size of the feature plane. When the memory access management unit 1024 directly reads out data from the interface of the memory that stores the feature planes of the intermediate and final layers, it is possible to obtain the same effect as in the first embodiment. Note that a CPU 806 and a RAM 808 existing outside the recognition processing unit 801 may be used as a general-purpose CPU and an address mapped memory, respectively.

Figure 11:
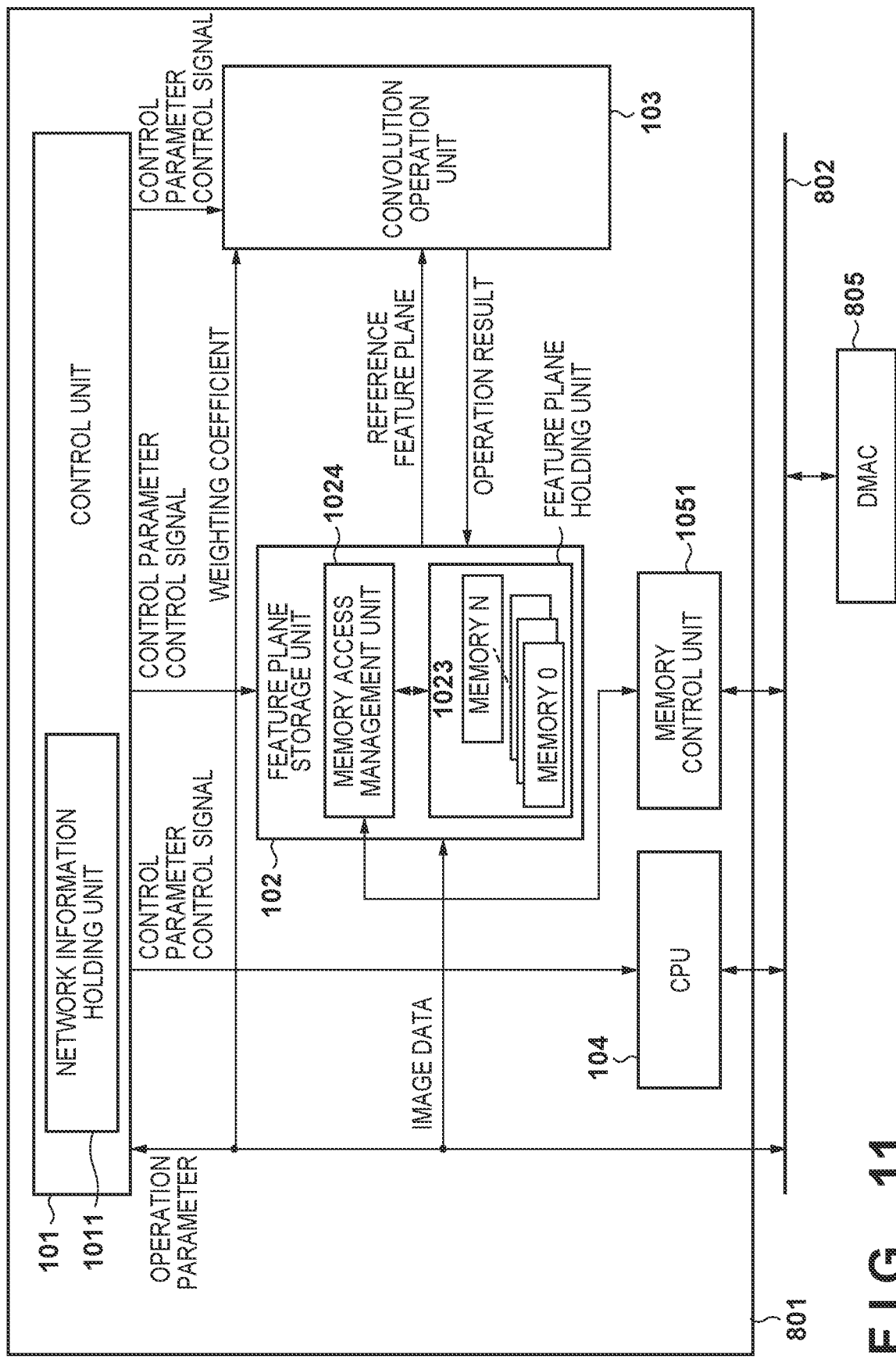
FIG. 11 is a block diagram showing an example of the arrangement of a recognition processing unit 801.

Note that each of the above-described embodiments has explained a case in which all the functional units shown in FIG. 1 or 11 are implemented by hardware. However, some of the functional units shown in FIG. 1 or 11 may be implemented by software (a computer program). In this case, this computer program is stored in a memory such as the ROM 807, and executed by a processor such as the CPU 806, thereby making it possible to implement the functions of the corresponding functional units.

Note that the practical numerical values used in the above description are used to make a detailed description, and each of the above-described embodiments is not limited to these numerical values. Note that some or all of the above-described embodiments may appropriately be combined. In addition, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123135, filed Jul. 1, 2019, which is hereby incorporated by reference herein in its entirety.

What is claimed is:

1. An operation processing apparatus for performing operation processing in a plurality of layers of a hierarchical neural network, comprising:
    an operation unit configured to perform the operation processing to generate a feature plane in a layer of the plurality of layers;
    a feature plane holding unit including a plurality of memories that hold the feature plane generated by the operation unit;
    a memory access management unit configured to select a memory from the plurality of memories and specify an address for an element of the feature plane, and write the element of the feature plane in the specified address in the selected memory based on network information which includes information about the layer in which the feature plane has been generated and to manage reading from and writing to the plurality of memories; and
    a processor connected to the feature plane holding unit via a bus,
    wherein the plurality of memories in the feature plane holding unit are mapped at addresses in a memory space, and
    wherein the processor calculates, based on the network information, an address of the feature plane in the memory space, and reads out the feature plane from the calculated address in the memory space.

2. The apparatus according to claim 1, wherein the information about the layer includes a number of the layer, a horizontal size and a vertical size of each feature plane, and a number of feature planes.

3. The apparatus according to claim 1, wherein the plurality of memories store a feature plane of one of an intermediate layer and a final layer among the plurality of layers, and the processor processes the feature plane of one of the intermediate layer and the final layer.

4. The apparatus according to claim 1, wherein the processor calculates the address based on the network information and information obtained from the memory access management unit.

5. The apparatus according to claim 1, wherein the feature plane in the feature plane holding unit is interleaved in the plurality of memories on a layer basis.

6. The apparatus according to claim 1, wherein the feature plane in the feature plane holding unit is interleaved in the plurality of memories on a line basis.

7. The apparatus according to claim 1, wherein the memory access management unit calculates a storage destination in the plurality of memories based on an access request address from the processor, reads out data, and returns the data.

8. An operation processing method for an operation processing apparatus that performs operation processing in a plurality of layers of a hierarchical neural network, wherein
the operation processing apparatus includes
an operation unit configured to perform the operation processing to generate a feature plane in a layer of the plurality of layers,
a feature plane holding unit including a plurality of memories that hold the feature plane generated by the operation unit;
a memory access management unit configured to manage reading from and writing to the plurality of memories, and
a processor connected to the feature plane holding unit via a bus,
wherein the plurality of memories in the feature plane holding unit are mapped at addresses in a memory space, and
the method comprising:
selecting a memory from the plurality of memories and specifying an address for an element of the feature plane, and writing the element of the feature plane in the specified address in the selected memory by the memory access management unit based on network information which includes information about the layer in which the feature plane has been generated; and
calculating, based on the network information, an address of the feature plane in the memory space, and reading out the feature plane, by the processor.

* * * * *